Patented Jan. 10, 1950

2,494,524

UNITED STATES PATENT OFFICE 2,494,524

2-(BENZENE SULFONAMIDO)-TETRAHYDROBENZOTHIAZOLES

James M. Sprague, Drexel Hill, Pa., assignor to Sharp & Dohme, Incorporated, Philadelphia, Pa., a corporation of Maryland No Drawing. Application January 12, 1943, Serial No. 472,156

4 Claims. (Cl. 260—239.6)

This invention relates to new heterocyclic derivatives of sulfanilamide in which a heterocyclic radical is linked to the nitrogen atom of the sulfonamido group, and more particularly to such derivatives in which the heterocyclic grouping is derived from the azoles, azines, and polynuclear, e. g., bicyclic, heterocyclic groupings.

The new products of this invention are in general therapeutically useful in varying degrees and applications, and particularly in combatting bacterial infections such as coccus infections, such as streptococcus and especially pneumococcus.

The products of the invention may be represented by the general formula

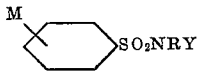

in which M is an amino group or a group convertible thereto, for example, hydrolyzable thereto, as an acylamino as an alkoylamino group, or a group reducible to amino, for example, nitro or diazo, or M may also be a substituted amino group as an alkyl- or acylalkyl- or aralkyl-amino group; and R is a positive radical such as hydrogen and the cationic radicals as the alkali-type radicals, sodium, potassium, ammonium and substituted-ammonium and the like, or an alkyl radical, saturated or unsaturated, for example, methyl, ethyl, propyl, butyl, amyl, allyl, hexyl, heptyl, octyl and the like, or decyl, dodecyl, hexadecyl and the like, or aralkyl as benzyl and the like; and Y is a heterocyclic radical attached to the sulfonamido nitrogen and selected from the group consisting of azoles, azines, and polynuclear, e. g. bicyclic, heterocyclic groups which may be substituted or unsubstituted.

The azokyl group which may be represented by Y may be that of a thiazole derivative such as the 6-alkylbenzthiazoles and the 4,6-tetrahydrobenzthiazoles, or thiazole per se when M is acylamino with the acyl group having at least four carbon atoms, and preferably from four to six, in its carbon chain, and of such thiazoles, their nuclearly substituted derivatives, or of an oxazole derivative such as oxazole, iso-oxazole, oxazoline, or of a diazole derivative such as an imidiazole derivative, such as imidazole or benzimidazole, and their nuclearly substituted derivatives. Accordingly, the expression "azole" embraces solely the various types of heterocyclic groups exemplified in this paragraph, each of which contains a 5-atom heterocyclic ring having at least nitrogen as a hetero-atom.

The azyl substituent which may be represented by Y may be that of a thiazine derivative such as meta-thiazine or para-thiazine or their hydro-derivatives, either di- or tetra-hydro, and the nuclearly substituted derivatives of any of them, or of a diazine such as the pyridazines (1,2-diazines or ortho-diazines), as pyridazine, or the pyrimidines (1,3-diazines or meta-diazines), for example, pyrimidine, or the pyrazines (1,4-diazines or para-diazines), as pyrazine, or the hydroderivatives, such as the di-, tetra- or hexa-hydro derivatives of any of these types of diazines, for example, piperazine, as well as the nuclearly substituted derivatives of any of these diazines, whether hydrogenated or not. Thus, the expression "azyl" embraces solely each of the various types of 6-atom ring exemplified in this paragraph and containing at least nitrogen as a hetero-atom.

Similarly, the expression "thiazyl" embraces solely the various types of 6-atom rings described in the immediately preceding paragraph, in which rings both sulphur and nitrogen are present as the hetero-atoms.

The polynuclear heterocyclic grouping may be built up of fused nuclei or of linked nuclei (in which the two nuclei are joined by a single bond) and in each case may consist of bicyclic groupings containing the same number of atoms in each nucleus or a different number of atoms in each nucleus and in which one nucleus or both nuclei may be heterocyclic. The quinazolines (quinazoline and its nuclear substituted derivatives) exemplify the bicyclic groupings, e. g., the fused nuclei grouping and those in which each nucleus contains the same number of atoms, namely 6, and in which one nucleus is heterocyclic and the other homo- or iso-cyclic. The xanthines (xanthine and its nuclear substituted derivatives) are also built up of fused nuclei and illustrate the bicyclic groupings in which there is a different number of atoms in each nucleus, namely 5 and 6, and in which each nucleus is heterocyclic, while the substituted pyrimidyl derivatives such as phenyl-pyrimidines (whether substituted in either or each nucleus) represent the binuclear groupings in which each nucleus has the same number of carbon atoms, namely 6 and 6, and in which the two nuclei are linked together by a single bond and one nucleus is heterocyclic, and the other is isocyclic.

The nuclear substituent of the heterocyclic group may be a hydrocarbon radical such as a saturated or unsaturated alkyl radical, for example, methyl, ethyl, propyl, butyl, amyl, allyl and the like, or an aryl radical as phenyl, naphthyl, or aralkyl radical as benzyl and the like, or may be an alkoxy radical such as methoxy, ethoxy, propoxy, or may be a carbaloxy radical as carbmethoxy, carbethoxy, or may be a halogen as chlorine or bromine, or carboxy.

The nuclear substituent on the azolyl and particularly on the azyl group represented by Y and especially on the pyrimidyl group may be of the hydrocarbon radical type such as the saturated or unsaturated alkyl radicals, straight or branched chain or cyclic, monovalent mono- or di-substituent, for example, methyl, di-methyl, ethyl, di-ethyl, propyl, butyl, iso-butyl, amyl, allyl, methallyl, cyclo-pentyl and -hexyl, cyclopentenyl and the like, or an aryl radical such as phenyl, tolyl, naphthyl, or aralkyl radical as benzyl and the like, or polyvalent as polyalkylene such as polymethylene, e. g., tetramethylene and the like, or may be a radical containing oxygen or sulfur as the hydroxyl group or an alkoxy group such as methoxy, ethoxy, propoxy and the like, or the corresponding sulfur analog radical such as an alkylthio radical as methylthio or ethylthio group and the like, or the carbalkoxy radical as carbmethoxy, carbethoxy or carboxy and the like, or may also be a halogen radical, for example, chlorine or bromine. One or more nuclear substituents may occur on the same heterocyclic nucleus, for example, on the pyrimidyl nucleus and, in the latter case, they may be identical or different examples of the same type or of entirely different types as noted from the examples hereinbelow.

In the various cases in which R may be either hydrogen or an alkyl or aralkyl radical or some other positive radical, M may be either a nitro, an amino, alkylamino, acylalkylamino or an acylamino radical, such as the butyryl-, valeryl-, caproyl-, heptoyl-, and octoylamino radicals and the like, and Y may be either a non-substituted or substituted azolyl or azyl group, such as the substituted or unsubstituted pyrimidyl or pyrazyl group.

The products of this invention in which M of the general structural formula is a nitro or acylamino group while R is hydrogen are generally prepared by condensing an amino derivative of a heterocyclic compound (having the heterocyclic structure which it is desired to introduce into the end product) with, for example, either a nitro- or acylamino-phenylsulfonyl halide, e. g., o- or p-nitrobenzenesulfonyl chloride or p-acetylaminobenzenesulfonyl chloride, and splitting off hydrogen halide, the reaction being carried out in a suitable solvent such as pyridine, or acetone in the presence of an excess of the amino heterocyclic compound.

The corresponding products in which M is an amino group are obtained either by reducing, preferably by catalytic reduction, the above described nitro compound having R as hydrogen, or by hydrolyzing the described corresponding acylamino compound in either the presence of acid or, in many cases, preferably in the presence of alkali.

To prepare the product in which R of the general structural formula is an alkyl or aralkyl group and M is a nitro or acylamino group, the nitro- or acylamino-phenylsulfonamido heterocyclic compound above described in which R of the general formula is hydrogen is alkylated by reaction with a suitable alkylating agent such as an alkyl halide, as ethyl iodide or methyl chloride or bromide or ethyl chloride or bromide, or an alkyl sulfate as diethyl sulfate, or an alkyl sulfonate, and the like, or aralkylated by reaction with a suitable aralkylating agent, as benzyl chloride, to replace the hydrogen represented by R by the desired alkyl or aralkyl radical. The desired end product in which R is alkyl or aralkyl and M is amino is obtained by reducing the corresponding nitrophenylsulfonyl-alkylamido (or -aralkylamido) heterocyclic compound or hydrolyzing the corresponding acylamino-phenylsulfonyl-alkylamido (or -aralkylamido) heterocyclic derivative.

The alkylation of the acylamino-phenylsulfonamido pyrimidyl compound is advantageously carried out by dissolving such starting material in dilute aqueous sodium hydroxide and alkylating by shaking with a slight excess of the selected alkylating agent such as dimethyl sulfate. The alkylation may be carried out similarly with the nitro-phenylsulfonamido pyrimidyl starting material. Thus there is obtained the (p-acetylaminophenylsulfonylmethylamino)- or the corresponding (nitrophenylsulfonylmethylamino)-pyrimidyl product, the acetyl derivative yielding upon hydrolysis, and the nitro derivative yielding upon reduction, the corresponding (aminophenylsulfonylmethylamino)-pyrimidyl derivative. If the dimethyl sulfate is replaced by diethyl sulfate, the corresponding acylamino- or nitro-phenylsulfonylethylamido pyrimidyl derivative is obtained, the acetylamino product yielding on subsequent hydrolysis, and the nitro derivative yielding upon subsequent reduction, the (aminophenylsulfonylethylamino)-pyrimidyl product.

The invention may be illustrated by, but not restricted to, the following examples, in which the numerical positions in the pyrimidyl nucleus,

are determined by designating the lower left hand corner nitrogen atom as in the 1-position and then going on clockwise to the lower right hand carbon atom as in the 6-position:

*Example 1.—2-(sulfanilamido)-6-methyl pyrimidine.*—To a well agitated solution of 6.95 g. of 2-amino-6-methyl pyrimidine in 40 cc. of pyridine, 15 g. of p-acetylaminobenzenesulfonyl chloride are added in small portions over a thirty minute period. The reaction mixture is then heated on a steam bath for thirty minutes, the free pyridine being then removed under reduced pressure and the residue mixed with cold water, and the latter mixture is vigorously stirred. The solid reaction product is removed by filtration and washed with cold water. There is obtained a yield of 14 g. of crude 2-(p-acetylaminobenzenesulfonamido)-6-methyl pyrimidine, which on recrystallization from alcohol and water melts at 238–239°. The crude product is hydrolyzed by suspending it in 400 cc. of 2 N. hydrochloric acid and warming until solution is complete. The solution is neutralized with sodium carbonate and the precipitated 2-(sulfanilamido)-6-methyl-pyrimidine is removed by filtration. The latter on recrystallization from alcohol and water shows a melting point of 225–226°. The above described acetylamino intermediate and the amino end product obtained therefrom by hydrolysis may each be separately further purified by solution in dilute aqueous ammonia and with stirring decolorizing carbon into the solution. After filtering off the carbon, the purified product is recovered as the precipitate formed upon neutralizing the filtrate. The precipitate is then recrystallized from alcohol and water and, as thus purified, the dried 2-(p-acetylaminobenzenesulfonamido)-6-methyl-pyrimidine melts at 245–246° and the 2-(sulfanilamido)-6-methyl-pyrimidine melts at 230–231°.

If the above pyrimidine starting material is replaced by 4-amino-6-methyl pyrimidine, the corresponding acetylaminobenzenesulfonamido pyrimidine derivative results, which on hydrolysis yields 4-(sulfanilamido)-6-methyl pyrimidine,

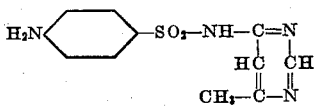

*Example 2.—2-(sulfanilamido) - 4 - ethoxy-6-methyl-pyrimidine.*—To a solution of 0.16 mol of 2-amino-4-ethoxy-6-methyl-pyrimidine (readily prepared from 2-amino-4-chloro-6-methyl pyrimidine and sodium dissolved in alcohol) in pyridine, 0.16 mol of p-acetylaminobenzenesulfonyl chloride is added in portions with stirring over a period of one and one-half hours. After the addition is complete, the reaction mixture is warmed on a steam bath for one hour and then chilled, and the crude 2-(p-acetylamino-benzenesulfonamido)-4-ethoxy-6-methyl - pyrimidine is removed by filtration and washed with cold water. The crude yield is 40 g., M. P. 238-40°. After recrystallization from alcohol and water, it melts at 244.5-245°. The crude product is dissolved in 10% sodium hydroxide and heated on a steam bath for one and one-quarter hours. The solution is chilled and neutralized with hydrochloric acid. Aqueous ammonia solution is added to redissolve the precipitated product and the resulting solution treated with decolorizing carbon. After filtering off the carbon and neutralizing the solution with acetic acid, the 2-(sulfanilamido)-4-ethoxy-6-methyl-pyrimidine is obtained in a hydrated form in 72% yield. It melts at 104-5° with loss of water of hydration, resolidifies and melts again at 151-152°. The material after recrystallization from 20% alcohol had the same melting point.

*Example 3.—2 - (sulfanilamido)-4-hydroxy-6-methyl-pyrimidine.*—Finely pulverized 2-(p-acetylaminobenzene-sulfonamido)-4-ethoxy-6-methyl-pyrimidine (see Example 2) is suspended in 2-normal hydrochloric acid and heated near refluxing until the solid dissolves completely and heating is then continued for fifteen minutes. The acid solution is neutralized with aqueous ammonia; the crude product (M. P. 225-230°) removed and recrystallized from 40% alcohol, M. P. 253.5-254°.

Using p-acetylaminobenzene sulfonyl chloride or any other selected acylaminobenzenesulfonyl chloride and condensing it with pyrimidine or any desired nuclear mono- or poly- substituent thereof in accordance with the procedure of Example 1 or 2, a wide variety of corresponding acylaminobenzene sulfonyl-pyrimidine derivatives is obtained, which on subsequent hydrolysis, preferably alkaline as in Example 2, yield a correspondingly wide variety of aminobenzenesulfonyl-pyrimidine derivatives as indicated by the following examples:

*Example 4.—2-(sulfanilamido)-pyrimidine,* the melting point of which is 251-252°, and of the corresponding intermediate acetyl derivative is 253-254°.

*Example 5.—2-(sulfanilamido)-4,6-dimethyl-pyrimidine,* the melting point of which is 175.5-176°, and of the corresponding intermediate acetyl derivative is 240-241.5°.

*Example 6.—4 - (sulfanilamido) - 2 - ethoxy-6-methyl-pyrimidine*

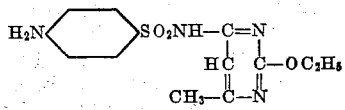

the melting point of which is 186-187°, and of the corresponding intermediate acetyl derivative is 200-201°.

In this example, if the 4-amino-2-ethoxy-6-methyl-pyrimidine is replaced by 4-amino-2-ethylthio-6-methyl-pyrimidine, the corresponding pyrimidine derivative of sulfanilamide is obtained in which the ethoxy group in the structural formula of this example is replaced by the ethylthio group, —SC₂H₅, melting at 188-189° and its corresponding acetyl intermediate at 208-209°.

*Example 7.—2-(sulfanilamido) - 6 - n - propyl-pyrimidine,* the melting point of which is 217-218°, and of the corresponding intermediate acetyl derivative is 253.5-254°.

*Example 8.—2-(sulfanilamido)-5-n-butyl-pyrimidine,* the melting point of which is 204-205°, and of the corresponding intermediate acetyl derivative is 241-242°.

*Example 9.—2-(sulfanilamido)-6-n-hexyl-pyrimidine,* the melting point of which is 208-209°, and of the corresponding intermediate acetyl derivative is 214-215°.

*Example 10.—2-(sulfanilamido)-5-methyl-pyrimidine,* the melting point of which is 262-263°, and of the corresponding intermediate acetyl derivative is 271-272°.

*Example 11.—2-(sulfanilamido)-6-phenyl-pyrimidine,* the melting point of which is 268-269°, and of the corresponding intermediate acetyl derivative is 274-275°.

If, in Example 5, 2-amino-4,6-dimethyl-pyrimidine is replaced by 2-amino-4-phenyl-6-methyl-pyrimidine, the corresponding acetyl intermediate and substituted pyrimidine derivative of sulfanilamide, having the phenyl group in the 4-position and the methyl group in the 6-position of the pyrimidine nucleus are obtained.

If, in this example, the 2-amino-6-phenyl pyrimidine is replaced by 2-amino-6-carbethoxy-pyrimidine, the corresponding acetyl intermediate and substituted pyrimidine derivative of sulfanilamide, having the carbethoxy group in the 6-position (instead of the phenyl group) are obtained.

*Example 12.—2 - (sulfanilamido) - tetrahydro-benzopyrimidine*

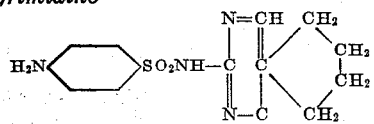

the melting point of which is 252-253°, and of the corresponding intermediate acetyl derivative is 255-256°. The preparations of this example illustrate the type in which there is attached a polyvalent substituent to the pyrimidine nucleus, the specific polyvalent substituent being the divalent tetramethylene group attached to the carbon atoms in the 5 and 6 positions of the pyrimidine nucleus. The end product of this example may also be designated as 2-(sulfanilamido)-tetrahydroquinazoline.

*Example 13.—2-(sulfanilamido) - 6 - methyl-5-bromo-pyrimidine,* the melting point of which is 231-232°, and of the corresponding intermediate acetyl derivative is 261-262°.

By replacing the 2-amino-6-methyl-5-bromo-pyrimidine in this example by another amino-halo-pyrimidine, other acetylaminobenzenesulfonamido-halo-pyrimidines are obtained. Thus, by condensing acetylaminobenzenesulfonyl chloride with 2-amino-4-chloro-pyrimidine, there is obtained 2-(p-acetylaminobenzenesulfonamido)-4-chloro-pyrimidine which upon hydrolysis yields 2-(sulfanilamido)-4-chloro-pyrimidine. If the amino-chloro-pyrimidine is replaced by 2-aminohydroxy-pyrimidine, the condensation with the sulfonyl chloride, as before, will yield the corresponding acetyl amino derivative and upon hydrolysis the corresponding sulfanilamido derivative having the hydroxyl group in the 4-position on the pyrimidine nucleus.

If, in any of the preceding examples, the p-acetylaminobenzenesulfonyl chloride is replaced by any other corresponding acylaminobenzenesulfonyl chloride, such as the o- or p-propionyl-, butyryl-, valeryl-, caproyl-, heptoyl-, or octoylaminobenzenesulfonyl chloride and a condensation carried out with 2-, 4-, or 5-amino-pyrimidine alone or as nuclearly substituted, as in any of the above examples or otherwise, the corresponding acylaminobenzenesulfanilamido-pyrimidine or -substituted-pyrimidine is obtained and upon acid, or preferably alkaline, hydrolysis thereof there results the corresponding 2-, 4- or 5-sulfanilamido-pyrimidine or -substituted-pyrimidine. A simple example is 5-(o-valerylaminobenzenesulfonamido)-pyrimidine and 5-(sulfanilamido)-pyrimidine.

*Example 14.*—2-(*p-caproylaminobenzenesulfanilamido*)-6-*methyl-pyrimidine*, the melting point of which is —, and which upon hydrolysis yields 2-(sulfanilamido)-6-methyl-pyrimidine which melts at 230–231°.

Other compounds result when in place of the acylaminobenzenesulfonyl chloride starting material, there is employed either o- or p-nitrobenzenesulfonyl chloride. In the procedures illustrated by any of the above examples, as shown by:

*Example 15.*—2-(*p-nitrobenzenesulfonamido*)-6-*methyl-pyrimidine*, the melting point of which is 260–261°.

*Example 16.*— 2-(*p- caproylaminobenzenesulfonamido*)-4-*methyl-thiazole*. The compound is obtained from 5.9 g. p-caproylaminobenzenesulfonyl chloride and 2.3 g. 2-amino-4-methyl-thiazole, using as reaction solvent 20 cc. pyridine, by a procedure similar to that described in Example 1. After recrystallization from 50% alcohol it melts at 171–172°,

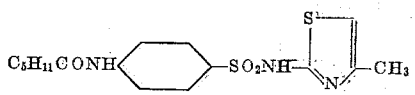

*Example 17.*—2-(*sulfanilamido*)-6-*methyl-benzothiazole*.—Using 2-amino-6-methyl-benzothiazole as the heterocyclic starting material and following the procedure outlined in Example 1, there is obtained 2-(p-acetylaminobenzenesulfonamido)-6-methyl-benzothiazole, which on recrystallization from alcohol and water melts at 297–299°, and upon hydrolysis yields 2-(sulfanilamido)-6-methyl-benzothiazole. The latter on recrystallization from alcohol and water has a M. P. of 282–283°,

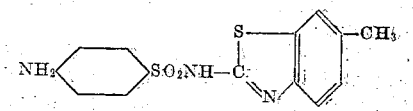

Condensing the corresponding p-acylaminobenzenesulfonyl chlorides with the same benzothiazole and splitting off hydrogen chloride, the corresponding 2-(acylaminobenzenesulfonamido)-6-methyl-benzothiazoles result. Similarly, with p-nitrobenzenesulfonyl chloride, the corresponding 2-(p-nitrobenzenesulfonamido)-6-methyl-benzothiazole results.

*Example 18.*— 2-(*sulfanilamido*)-4,6-*tetrahydrobenzothiazole*.—Employing 2-amino-4,6-tetrahydrobenzothiazole as the heterocyclic starting material and following the procedure outlined in Example 1, there is obtained 2-(p-acetylaminobenzenesulfonamido) - 4,6 - tetrahydrobenzothiazole, which on recrystallization from alcohol and water melts at 277–278°, and upon hydrolysis yields 2-(sulfanilamido)-4,6-tetrahydrobenzenethiazole. The latter recrystallized from alcohol and water has a M. P. of 249–250°,

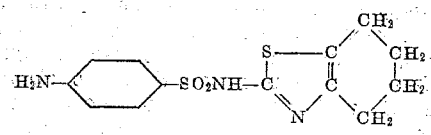

In the same manner as pointed out in Example 18, corresponding 2-(p-acylaminobenzenesulfonamido)-4,6-tetrahydrobenzothiazoles are obtained, as well as 2-(p-nitrobenzenesulfonamido)-4,6-tetrahydrobenzothiazole.

*Example 19.*—2-(*o-nitrobenzenesulfonamido*)-4-*methyl-thiazole*.—Condensing o-nitrobenzenesulfonyl chloride with the thiazole of Example 1 and splitting off hydrogen chloride, there results 2-(o-nitrobenzenesulfonamido)-4-methyl-thiazole, which on recrystallization from alcohol and water melts at 189–190°,

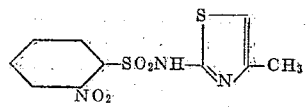

If, instead of pyridine as the reaction solvent, acetone is employed in the presence of a molar excess of 2-amino-4-methyl-thiazole, better yields are obtained.

Since the nitrogen atoms in the pyrazine nucleus are para to one another, there is only one aminopyrazine because regardless of which carbon atom the amino group is attached to, the amino group is always ortho to one of the nitrogen atoms. Thus, aminopyrazine is always 2-aminopyrazine. Thus, reacting aminopyrazine with p-acetylaminobenzenesulfonyl chloride in accordance with the procedure outlined in Example 1, there is obtained sulfanilamido-pyrazine or 2-(sulfanilamido)-pyrazine. Similarly, by reacting 2-amino-3,6-dimethyl-pyrazine with the p-acetylaminobenzenesulfonyl chloride as in Example 1, there is obtained 2-(sulfanilamido)-3,6-pyrazine.

In the pyridazines, the two nitrogen atoms are ortho to one another and in numbering the members of the pyridazine nucleus, one of the nitrogen atoms is considered in the 1-position and the other in the 2-position and continuing in that direction the carbon atoms are consecutively numbered. Thus, reacting 3-aminopyridazine with p-acetylaminobenzenesulfonyl chloride in accordance with the procedure in Example 1, there is obtained 3-(sulfanilamido)-pyridazine.

The general description of the invention and the examples show that the products of the invention are not limited to those above specifically illustrated and identified. It is seen that the desired products covered by the invention according to the illustrated general formula may structurally be considered as consisting of three essential portions, one being broadly the M-benzenesulfonyl portion, another being the heterocyclic portion, and these two being linked to the nitrogen atom of the middle (or third) portion which is an imino or substituted imino radical. The combination of these three essential portions gives the basic structure of any compound of the type contemplated, and it is readily seen that variations in substituents replacing any of the hydrogen atoms on any one or more than one of these three basic portions will yield different individual compounds embraced within the scope of the invention.

Thus, it is seen that if Y in the general structural formula is simply the pyrimidyl radical and R is hydrogen, one compound results when M is an amino group in the para position to the sulfonyl radical; another is obtained when M is a nitro group in the same para position and still another when M is a nitro group in the ortho position; still another when M is the caproylamino group. Still further additional individual compounds are obtained if the caproyl radical in the compound just last referred to is replaced by another suitable acyl radical in which case the term "acyl" is intended to designate broadly the monovalent radical resulting when the hydroxyl group of the carboxylic radical is removed from the molecule of a carboxylic acid.

Thus the just above referred to acyl radical may be saturated or unsaturated alkyl, aryl, aralkyl, alicyclic or heterocyclic, or substituted or unsubstituted, as illustrated by butyric, isobutyric, valeric, isovaleric, active valeric, caproic, alpha chlorcaproic, heptoic, caprylic, capric, lauric, palmitic, oleic, stearic, ricinoleic, myristic, behenic, benzoic, phenylacetic, phenylchloracetic, phenylaminoacetic, aminobenzoic, phenylpropionic, nitrobenzoic, pyromucic, cinnamic, chlorbenzoic, sulfobenzoic, mandelic, toluic, hydratropic, toluacetic, tropic, furalacrylic, hexahydrobenzoic, cyclopentanecarboxylic, nicotinic, and thiazole-4-carboxylic acids.

Other individual compounds are obtained when the benzenesulfonyl portion has one selected specific substituent of the type disclosed and the middle imino portion remains unsubstituted but variations are made in the heterocyclic portion by selecting any one of the specific heterocyclic configurations named or homologues thereof embraced within the disclosure or any such heterocyclic configuration or homologue thereof having a nuclear substituent of the type hereinabove set forth. Still other individual compounds are possible by selecting a fixed benzenesulfonyl portion with a specific substituent for M of the general formula and selecting a specific one of any of the heterocyclic radicals possible according to the disclosure and above description and replacing the hydrogen of the middle imino portion by any one of the saturated or unsaturated alkyl radicals.

Thus while variations in the general make-up of the products of the invention as just above indicated give the products specifically disclosed and also products such as 2-(sulfanilamido)-5-phenyloxazole, as 2-(sulfanilamido)-oxazoline, as 2-(sulfanilamido)-benzimidazole, as sulfanilamidobenzo-meta-thiazine

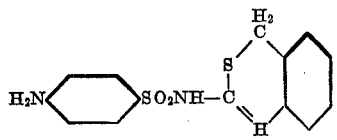

or as 8-(sulfanilamido)-caffeine,

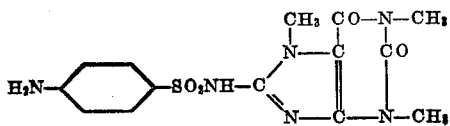

also designated as 8-(sulfanilamido)-1,3,7-trimethyl xanthine, and as 3-(sulfanilamido)-6-methyl-pyridazine, a very large number of other specific individual compounds are possible by making variations of the type hereinafter disclosed in either the benzenesulfonyl portion, the middle imino portion, or the end heterocyclic portion, or in any one or two or all of the portions by substituents of the type set forth, all of which different specific individual compounds are included as a portion of this disclosure without listing separately the individual names all of which are readily apparent as each individual structure with the selected substituent or substituents is drawn.

The position of the element M of the general structural formula is not restricted to para, for, as shown by Example 19, the nitro substituent represented by M may be made in the ortho position. Such nitro group in the ortho position in any compound embraced by the invention may, as pointed out above, be reduced to yield the corresponding compounds of the invention, in which M is an amino group in the ortho position. Such amino group in the ortho position of any compound embraced by the invention can be readily converted to any of the desired acylamino radicals to yield a compound embraced by the invention and in which M is an acylamino radical in the ortho position.

Of the products of the invention, those in which M of the general formula is an amino group in para position to the sulfonamide group are in general more effective in therapeutic use, although in varying degrees and applications, for example, in combatting bacterial infections such as the coccus infections as streptococcus and pneumococcus. While the other products of the invention, in which M of the general formula is a substituent other than the amino group, as a class may not be as generally applicable as those in which M is an amino group, those products in which M is other than an amino group are also useful in the pharmaceutical art as intermediates from which there may be obtained the generally more effective products having M as an amino group in the para position to the sulfonyl radical, as well as in other industrial applications wherein they may be used directly or as intermediates for the preparation of other products.

In the specification and claims, the terms "an azolyl," "a diazolyl," "an azyl," and "a diazyl" are used generically. So also are the terms "an oxazolyl," "an isooxazolyl," "an oxazolinyl," "an imidazolyl," "a benzimidazolyl," "a thiazyl," "a pyrazyl," "a pyrimidyl," "a pyridazyl," and "a xanthinyl" used generically to embrace the respective individual radicals from oxazole, isooxazole, oxazoline, imidazole, benzimidazole, the thiazines, meta-thiazine and para-thiazine, pyrazine, pyrimidine, pyridazine, and xanthine as well as from any homologues, isomers, and nuclear substituents of these individual respective radicals and of their homologues and isomers.

All melting points given in the specification are centigrade.

This application is a continuation in part of my copending application Serial No. 361,106, filed October 14, 1940, now Patent No. 2,407,966, September 17, 1946, and of my joint application with another Serial No. 287,936, now abandoned, filed August 2, 1939.

I claim:
1. A compound of the formula:

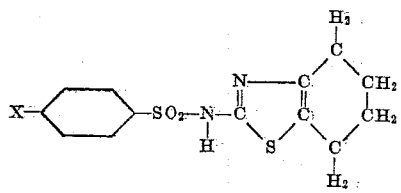

in which X is a radical from the group consisting of the free amino, acylamino and nitro groups.

2. The compound of the formula:

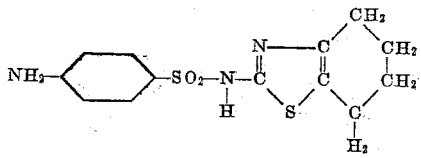

3. A compound of the formula:

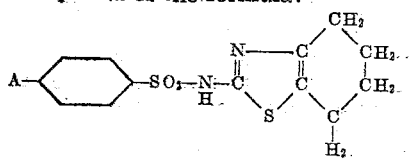

in which A is an acylamino group.

4. The compound of the formula:

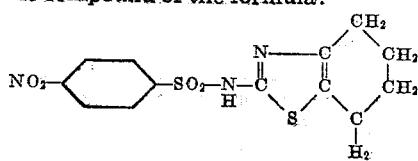

JAMES M. SPRAGUE.

REFERENCES CITED

The following references are of record in the file of this patent:

UNITED STATES PATENTS

| Number | Name | Date |
| --- | --- | --- |
| 1,898,431 | Dressel | Feb 21, 1933 |
| 2,362,087 | Newberry | Nov. 7, 1944 |

OTHER REFERENCES

Gelmo, Journ. fur Prak. Chemie (2) vol. 77 (1908), pp. 369–382.

Societe de Biologie, Goissedet et al., 1936, vol. 121, No. 11, pp. 1082–1084.

Societe de Biologie Fourneau et al., vol. 122 pp. 258–259.

Biochem. Journal, May 1937, pp. 724–730.

Journal Indian Chem. Society, vol. 14, December 1937, pp. 733–735.

J. Pharmaceutical Society of Japan, vol. 59, No. 3, March 1939, pp. 204–215.

J. Pharmaceutical Soc. of Japan, vol. 59, No. 7, July–August 1939, pp. 155–158.

Journal Applied Chemistry (U. S. S. R.), vol. XI, February 1938, pp. 316–327, cited in Chem. Abst., vol. 32, pp. 4150–4151.

Lancet (Whitby), May 28, 1938, pp. 1210–1212.

Southern Medical Journal, April 1941, pp. 446–447.

Journal Amer. Chem. Soc., September 5, 1941, pp. 2524–2525.

Certificate of Correction

January 10, 1950

Patent No. 2,494,524

JAMES M. SPRAGUE

It is hereby certified that errors appear in the printed specification of the above numbered patent requiring correction as follows:

Column 2, line 55, for "carbaloxy" read *carbalkoxy*; column 3, line 13, for "ethexy" read *ethoxy*; column 4, line 11, for "(p-acteylami-" read *(p-acetylami-*; column 6, lines 46 to 50, inclusive, for that portion of the formula reading

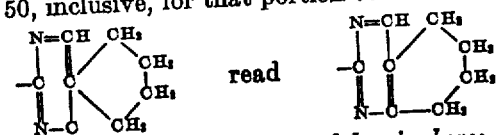

column 10, line 5, for the word "hereinafter" read *hereinabove*; and that the said Letters Patent should be read with these corrections therein that the same may conform to the record of the case in the Patent Office.

Signed and sealed this 11th day of July, A. D. 1950.

[SEAL]

THOMAS F. MURPHY,
*Assistant Commissioner of Patents.*